United States Patent [19]

Miller et al.

[11] Patent Number: 4,800,696

[45] Date of Patent: Jan. 31, 1989

[54] PREMISE WIRING SYSTEM FOR FRAME STRUCTURES

[75] Inventors: Vernon R. Miller, Atlanta; Lincoln E. Roberts, Decatur, both of Ga.

[73] Assignee: AMP Incorporated, Harrisburg, Pa.

[21] Appl. No.: 942,893

[22] Filed: Dec. 17, 1986

[51] Int. Cl.⁴ .......................... E04F 17/08; E04B 2/00
[52] U.S. Cl. ...................................... 52/221; 52/729; 174/48
[58] Field of Search ............... 52/221, 220, 729, 238.1, 52/239; 174/48, 49

[56] References Cited

U.S. PATENT DOCUMENTS

| | | | |
|---|---|---|---|
| 1,798,280 | 3/1931 | Sorensen | 52/221 |
| 1,872,527 | 8/1932 | Techmer | 52/220 |
| 1,999,741 | 4/1935 | Schullz . | |
| 2,000,539 | 5/1935 | Scheide | 52/221 |
| 2,079,635 | 5/1937 | Sharp | 52/220 |
| 2,125,136 | 7/1938 | Trojanowski | 52/220 |
| 2,175,145 | 10/1939 | Davison . | |
| 2,363,164 | 11/1944 | Waller | 52/729 |
| 2,808,136 | 10/1957 | Hammitt et al. . | |
| 3,195,698 | 7/1965 | Codrea | 52/239 |
| 3,377,756 | 4/1968 | Polhamus . | |
| 3,464,052 | 8/1969 | Hukin . | |
| 3,471,629 | 10/1969 | O'Leary . | |
| 3,529,389 | 9/1970 | Wilkins . | |
| 3,708,607 | 1/1973 | Brode | 174/48 |
| 3,814,833 | 6/1974 | Yamada | 174/48 |
| 3,890,759 | 6/1975 | Selden | 52/220 |
| 3,983,670 | 10/1976 | Lightfoot . | |
| 3,983,671 | 10/1976 | Boaden et al. . | |
| 4,038,796 | 8/1977 | Ecker | 52/221 |
| 4,308,418 | 12/1981 | Van Kulk | 174/48 |
| 4,479,687 | 10/1984 | Humphreys . | |
| 4,606,595 | 8/1986 | Dola . | |

OTHER PUBLICATIONS

"AMP Products for The Office of The 80's . . . and Beyond", Cat. #4-404845-4, 1984.

Primary Examiner—John E. Murtagh
Attorney, Agent, or Firm—Robert W. Pitts

[57] ABSTRACT

A frame structure includes recessed channels 40 in which the cables in an electrical distribution system are positioned. Communicating channels are formed in an upper beam 24, a lower beam 26 and a plurality of vertical columns 30. Installation of the complete electrical wiring system, including cables 76 and outlets or switches is part of a single operation and need not be interrupted by the erection of wall panels 32. Stamped metal brackets 48, 50, 60 attaching the columns to the upper and lower beams also retain cables within the channels and secure molding strips 34, 36, 38 over the channels.

13 Claims, 11 Drawing Sheets

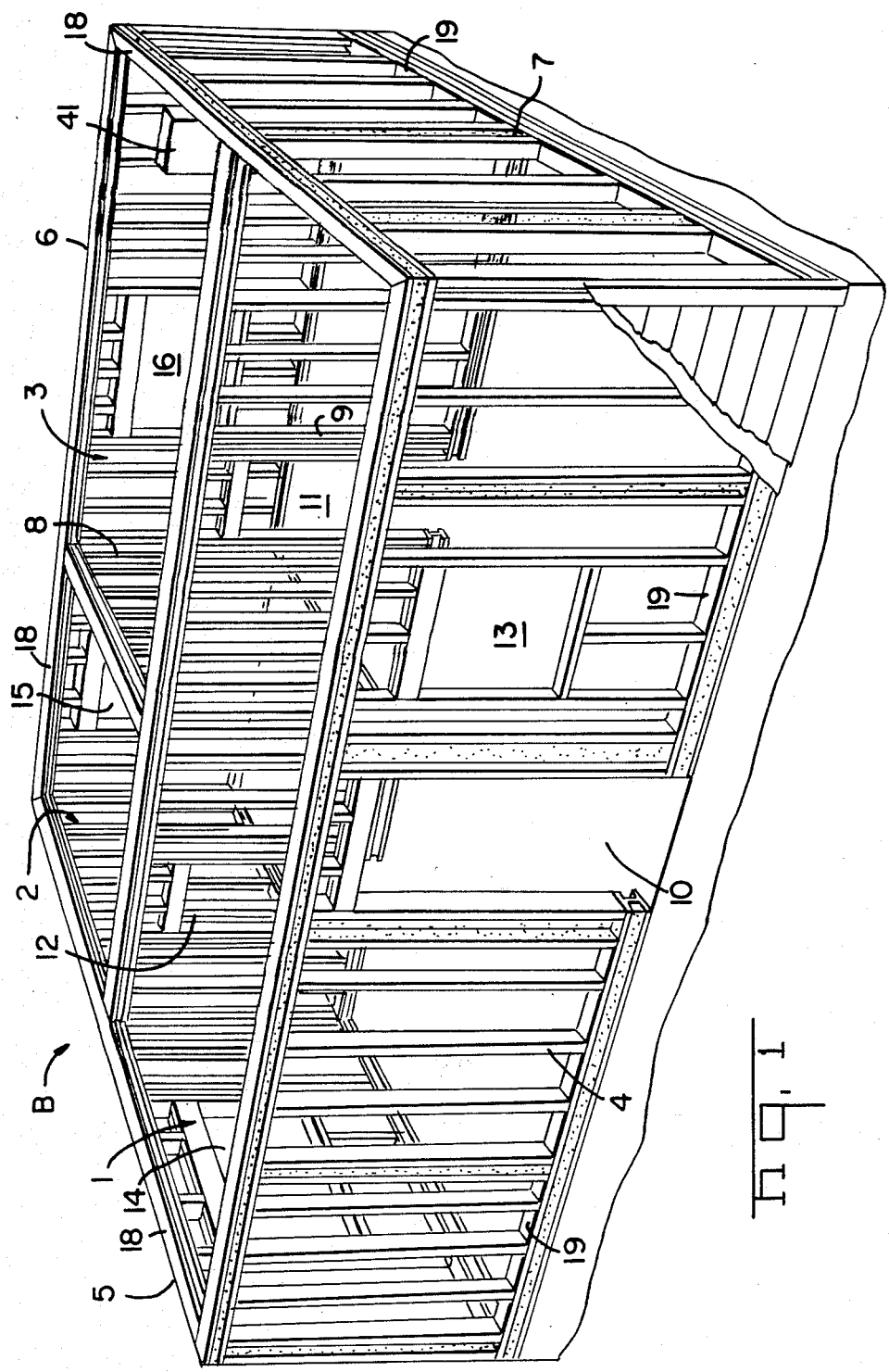

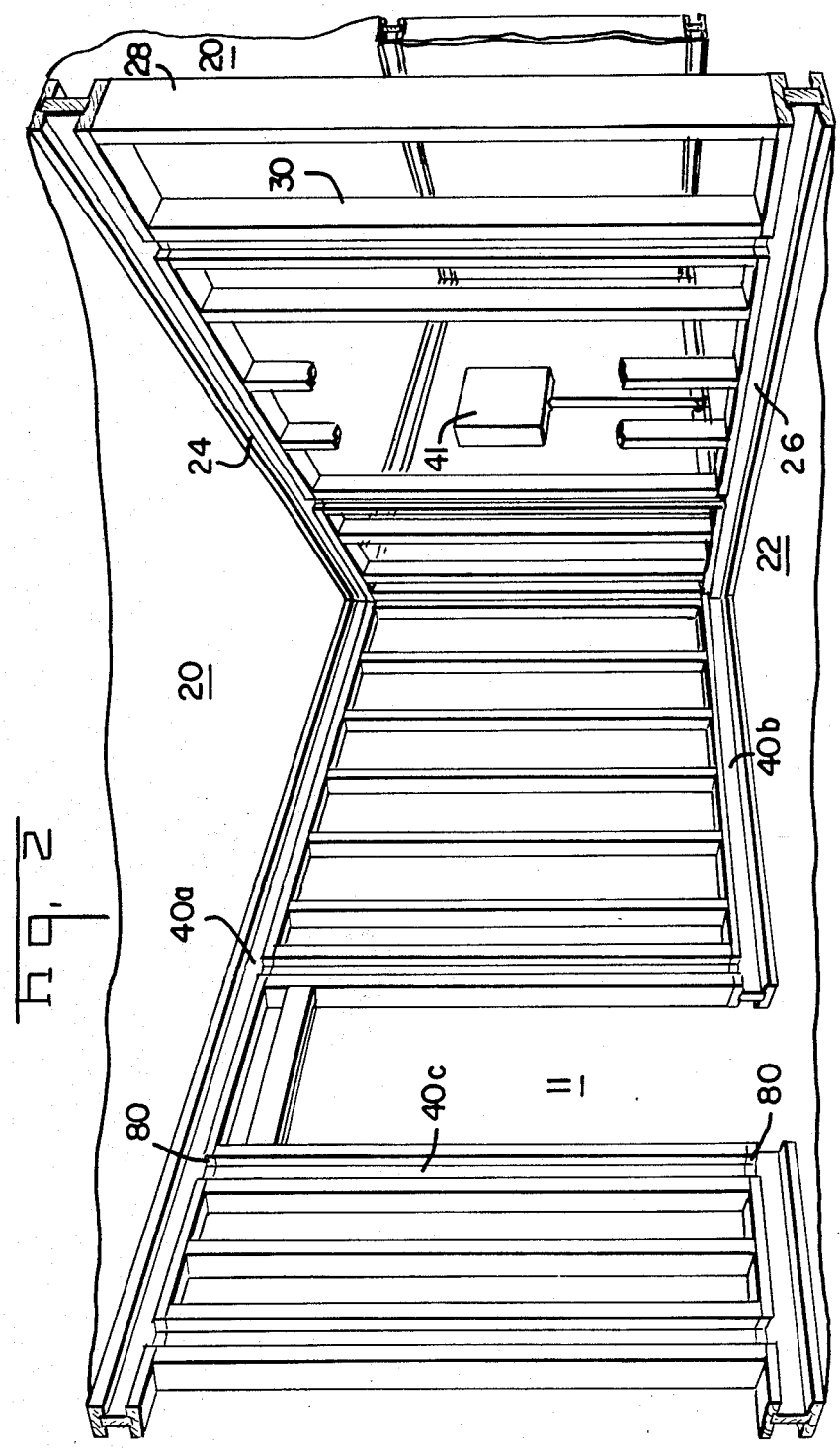

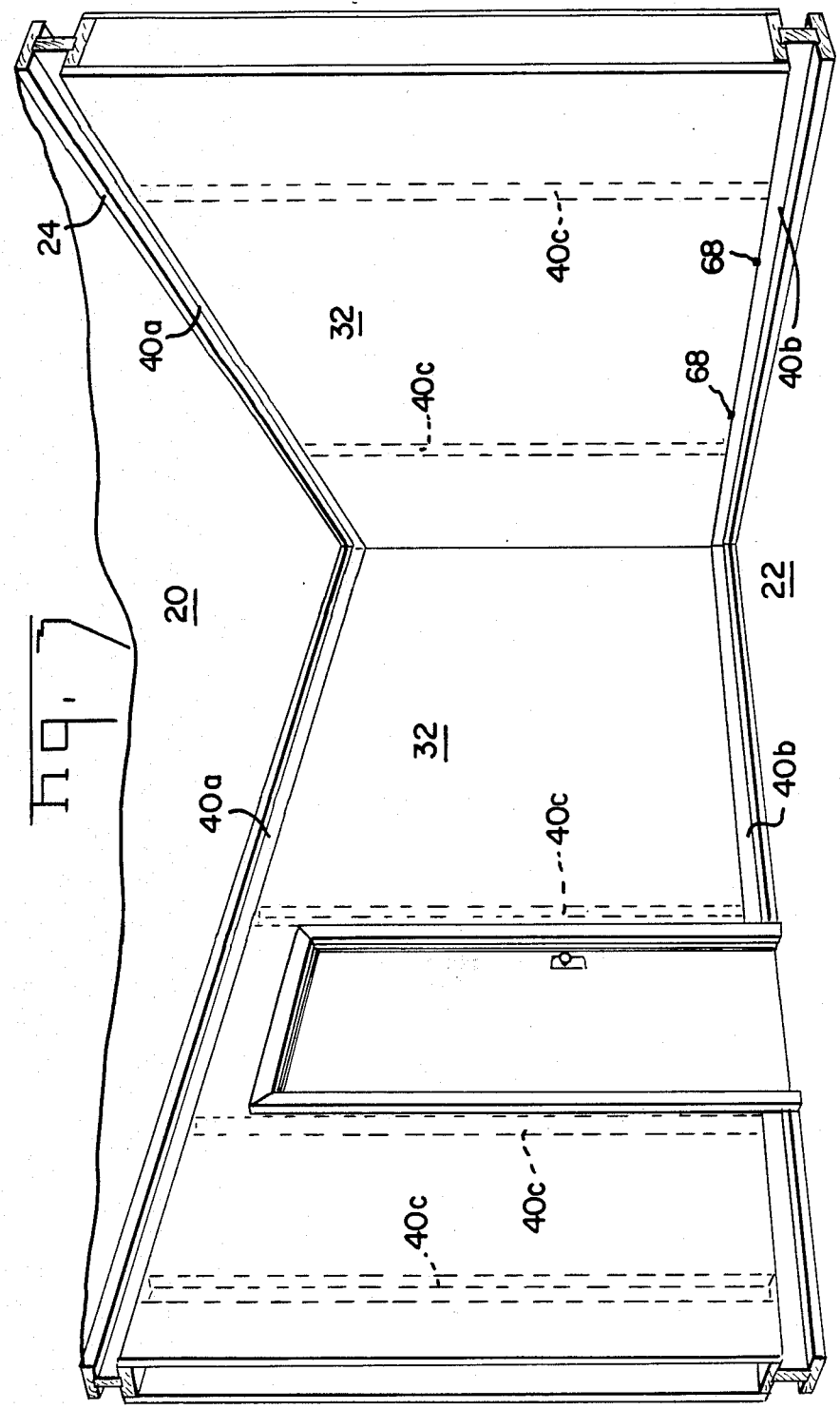

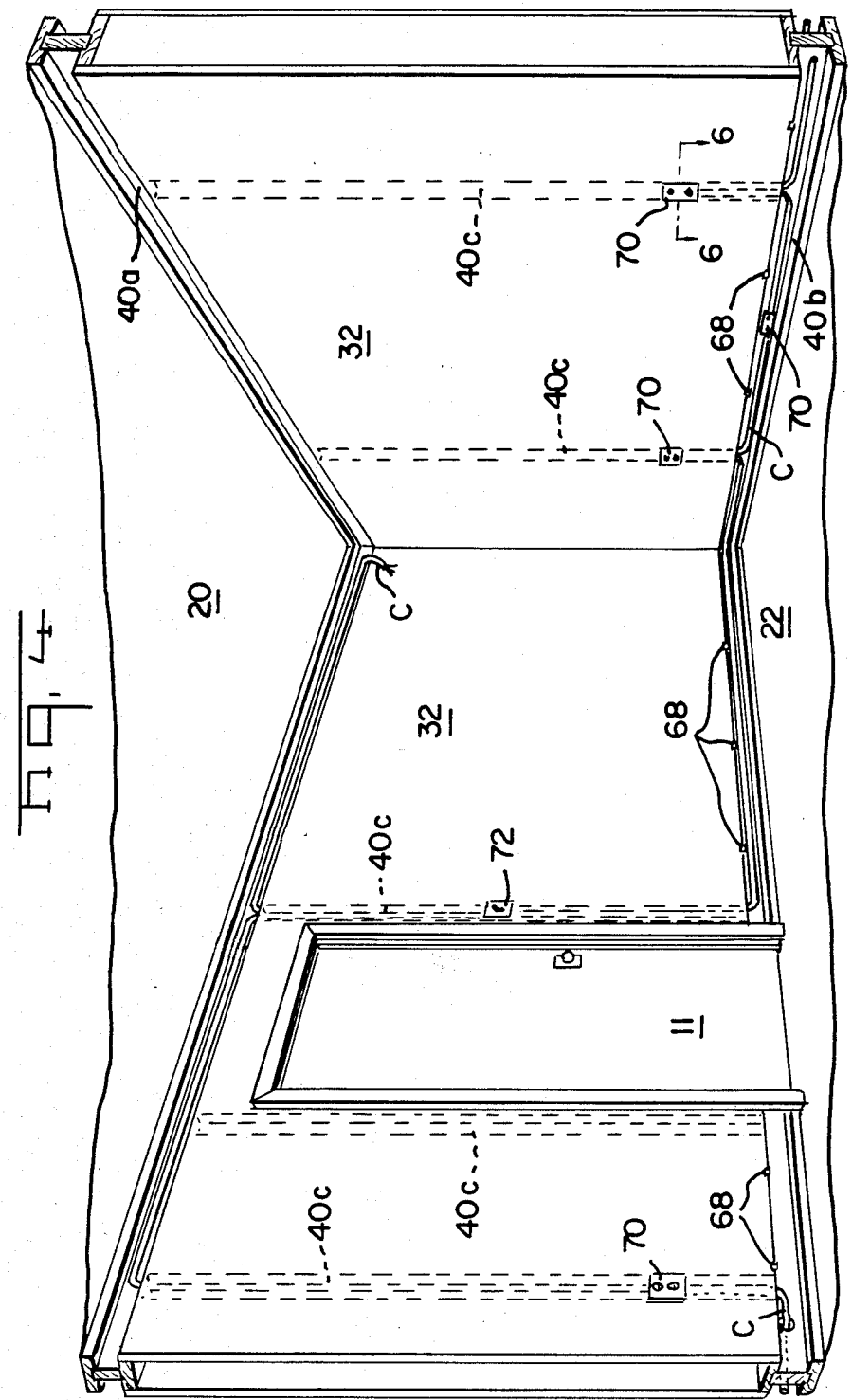

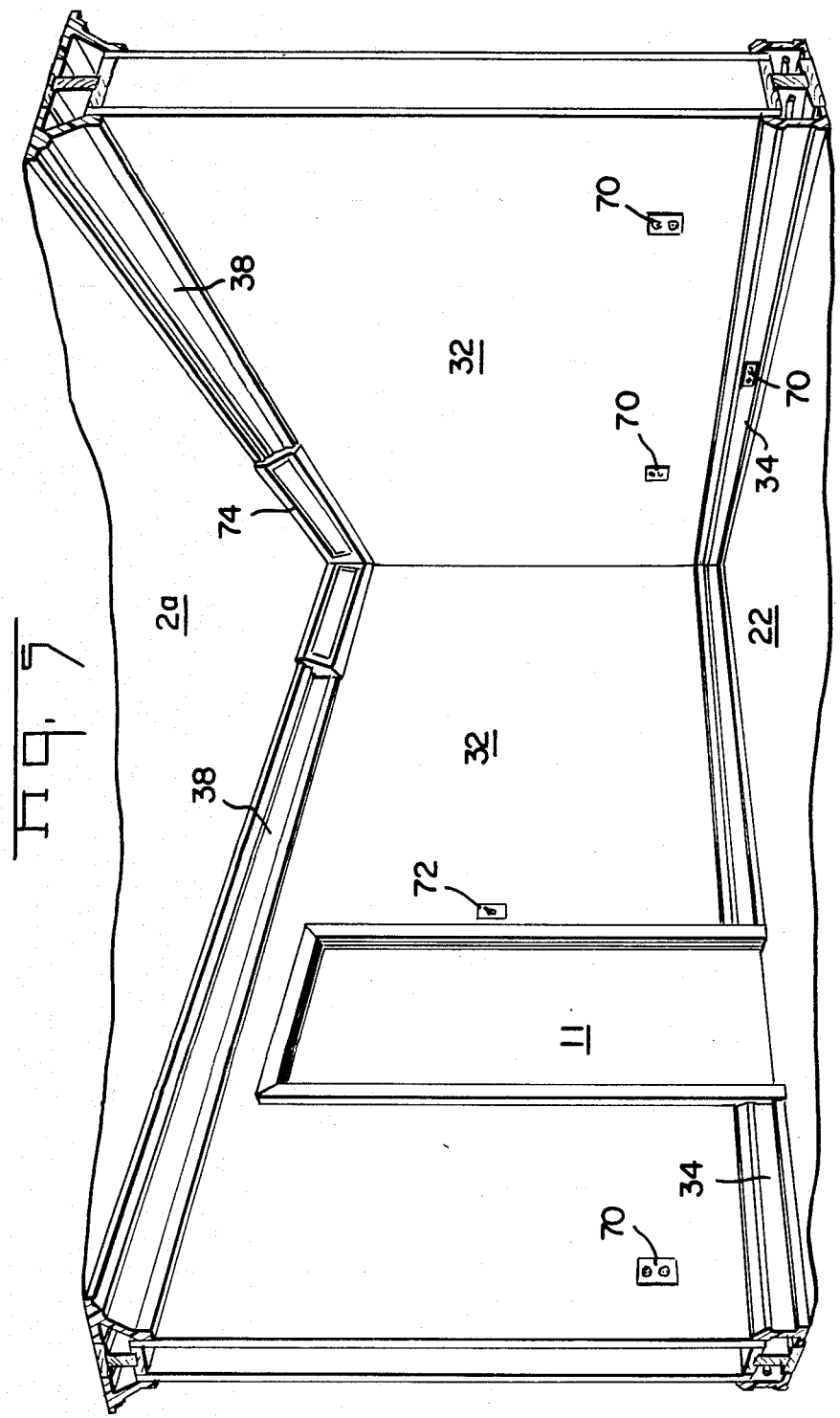

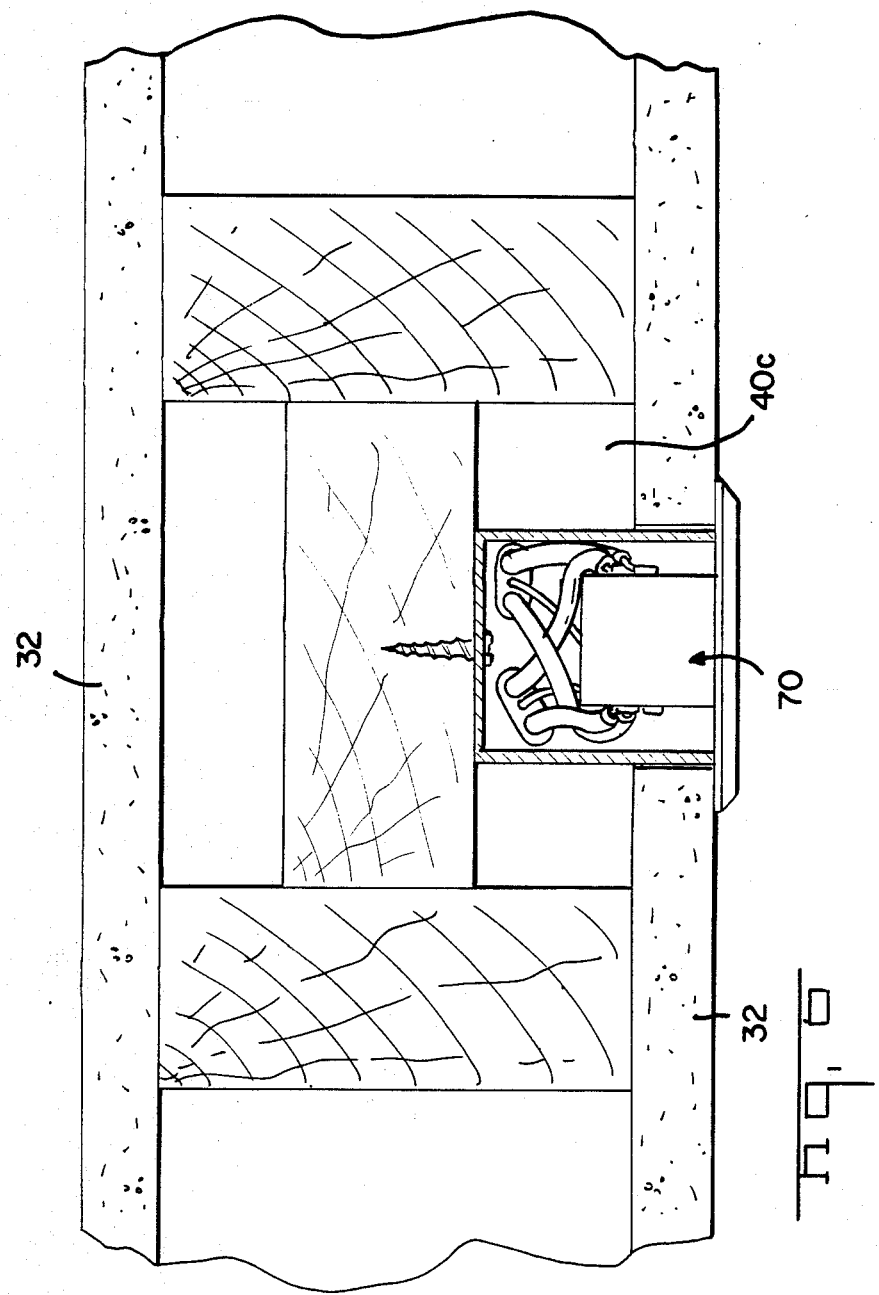

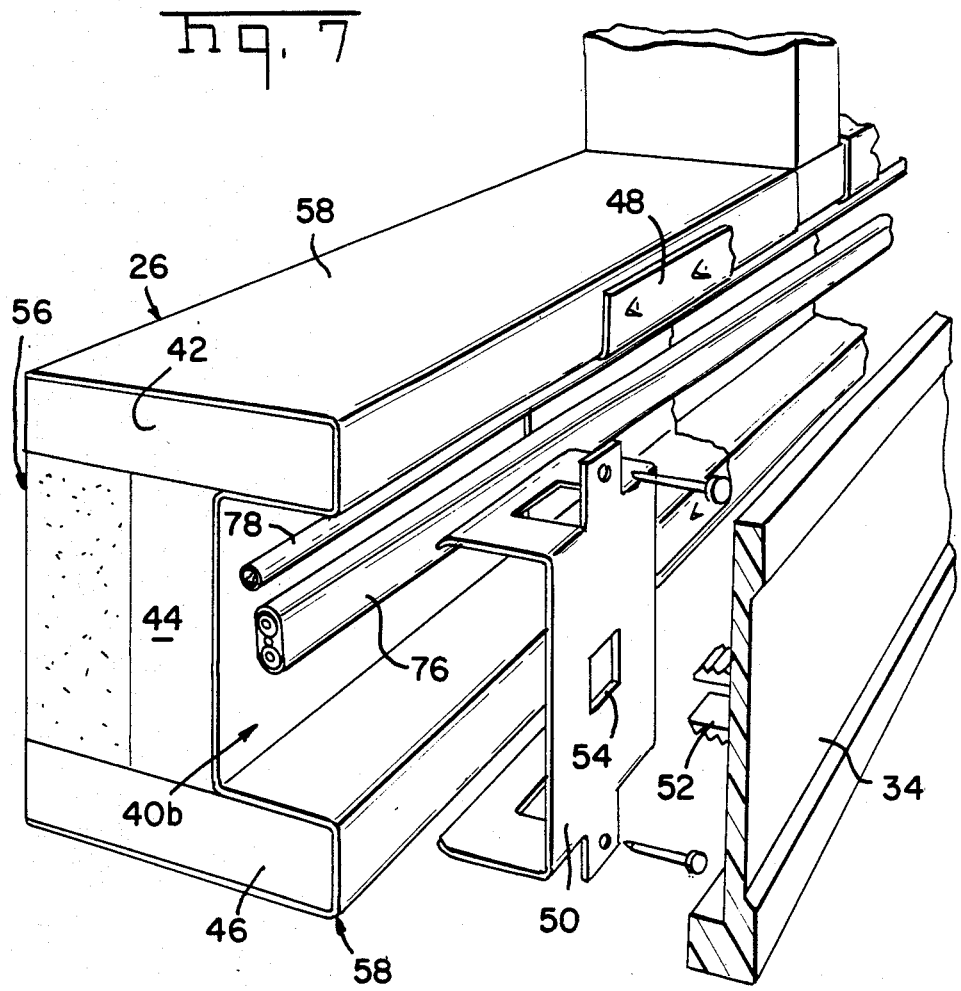

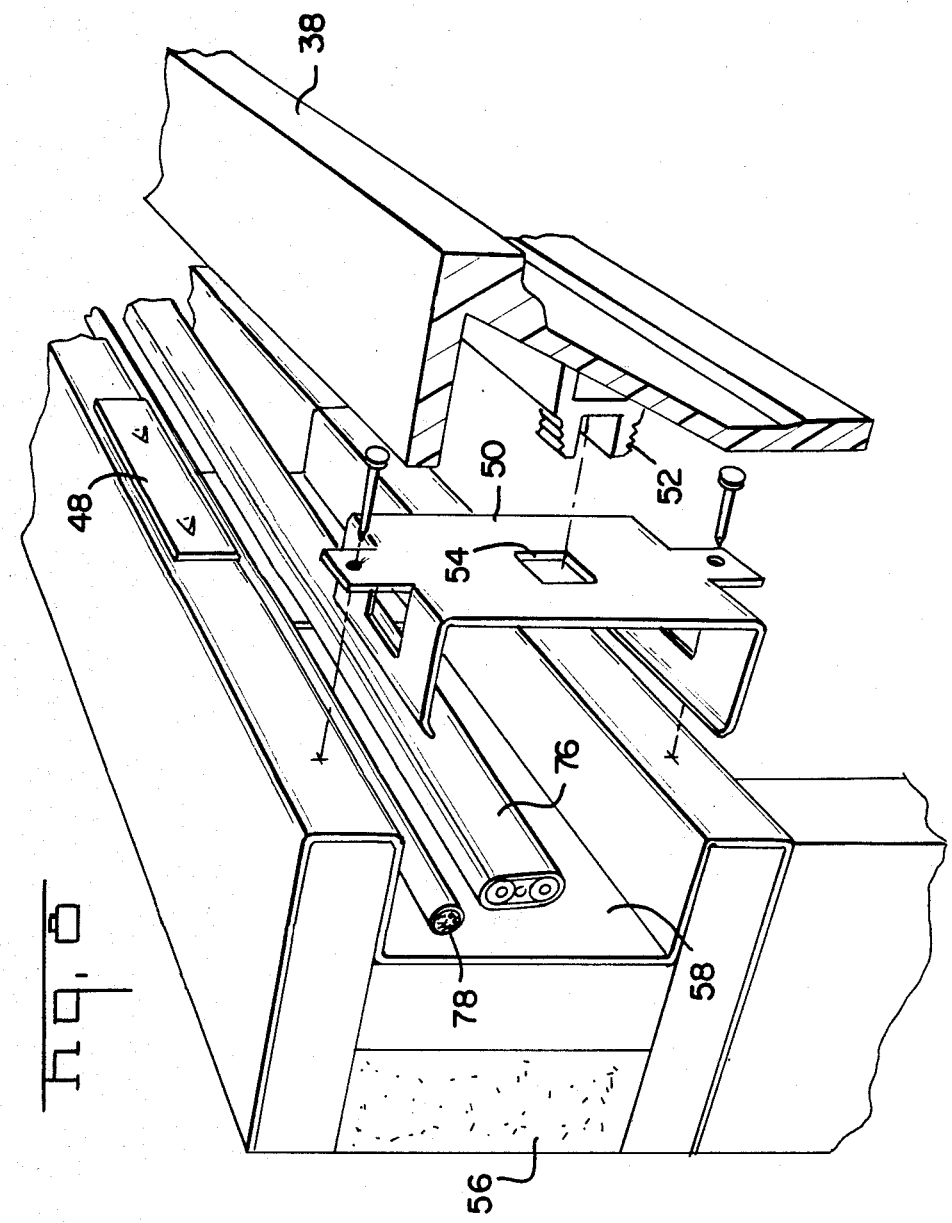

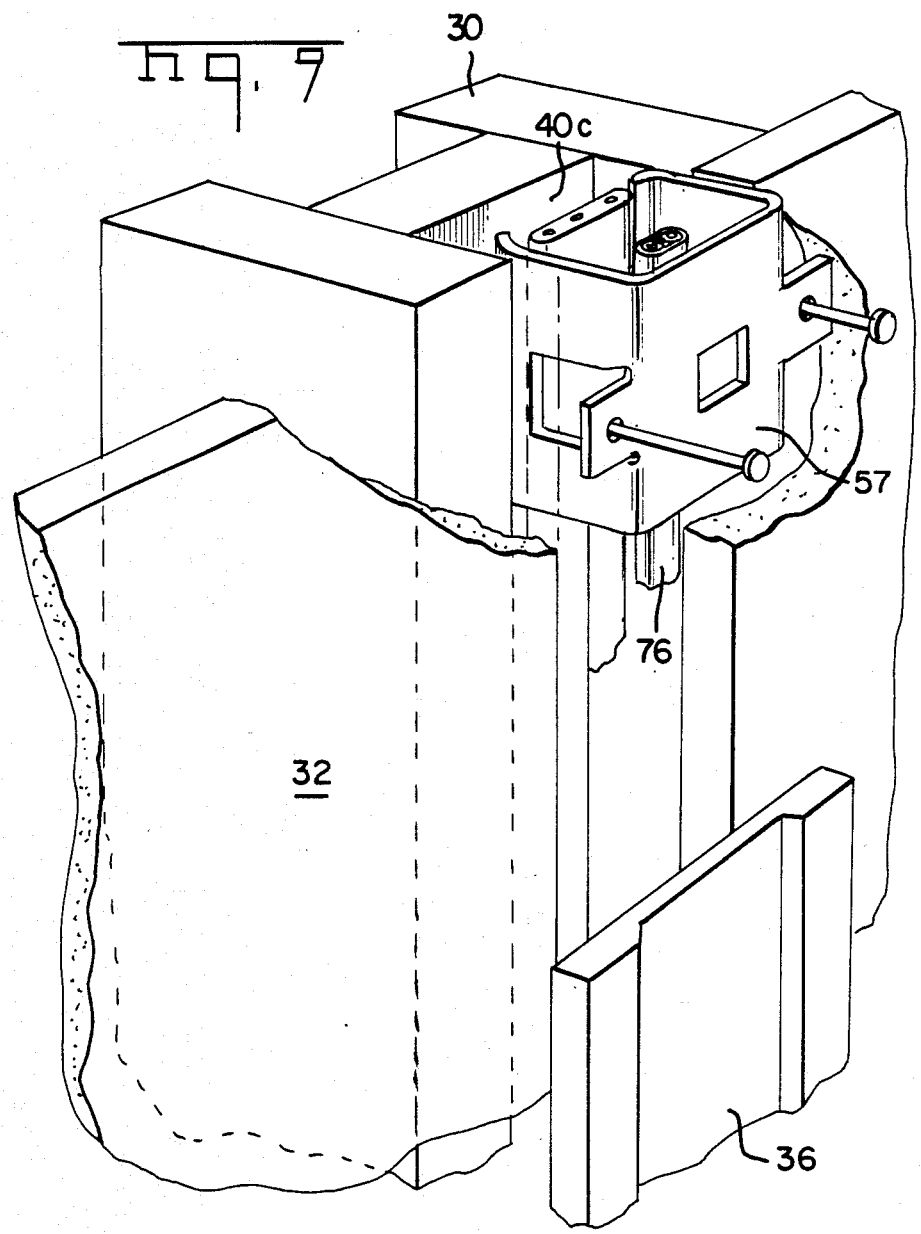

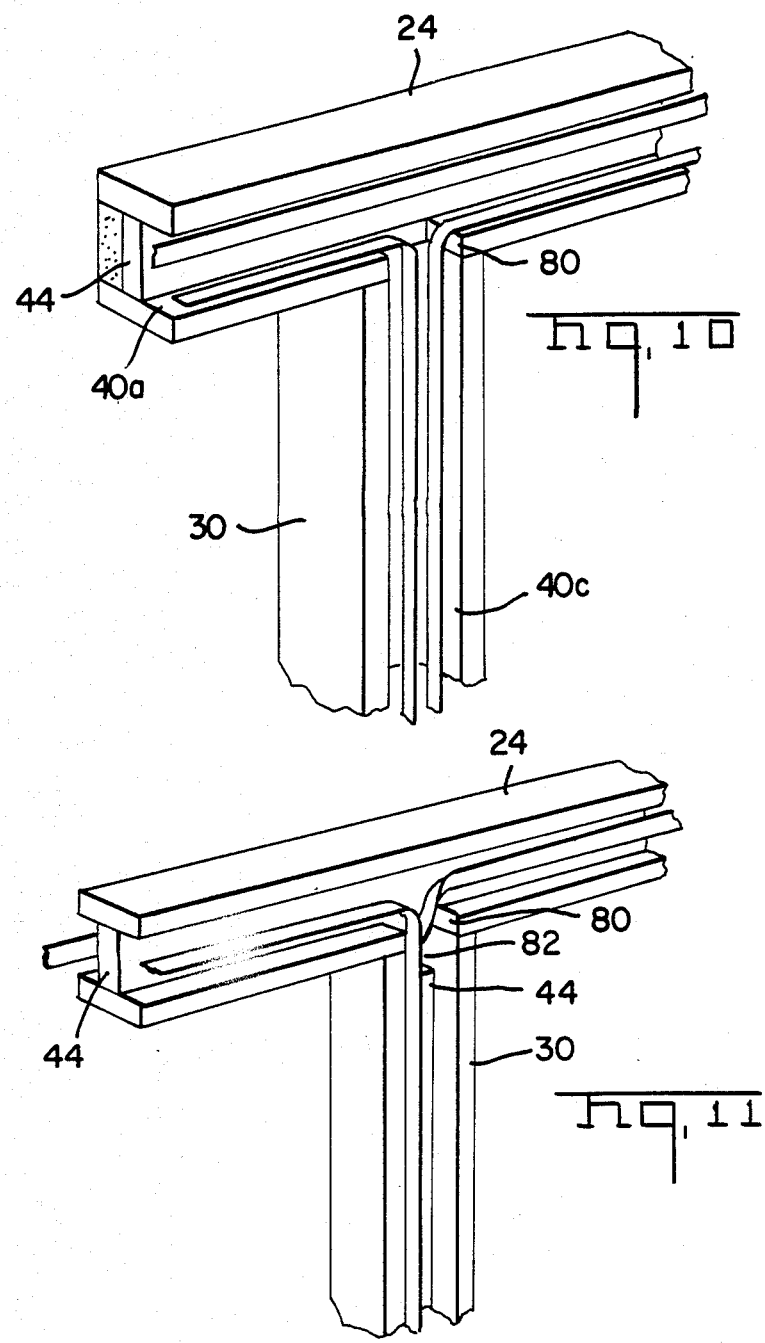

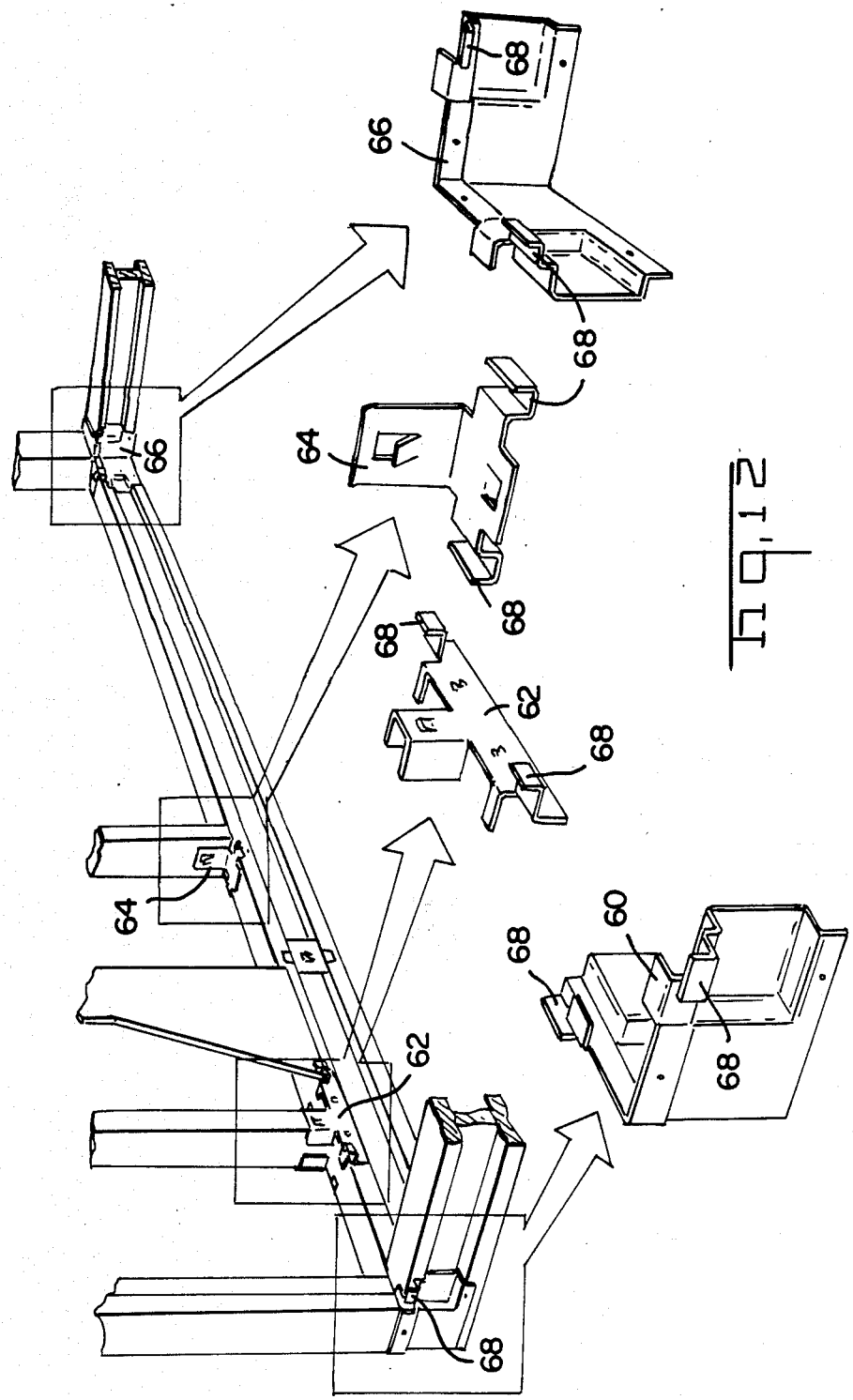

PREMISE WIRING SYSTEM FOR FRAME STRUCTURES

BACKGROUND OF THE INVENTION

1. Field of the Invention

This invention relates to an electrical distribution system for use in a frame structure such as the house and more particularly to a means of delivering electrical current, for example electrical power distribution or telephone signal distribution, through channels recessed behind the structure walls.

2. Description of the Prior Art

Conventional frame construction such as residential and light commercial construction has not traditionally taken the distribution of electrical power directly into account. In conventional construction, electrical power and telephone signals have customarily been added on to the structure after its completion rather than being integrated into the structure itself. Conventional wiring systems have often been referred to as open wire, cable and conduit systems. The conductors used in open wiring are supported on the structure by means of insulative supports, such as porcelain split knobs. Wire protecting tubes or other means must be used when the conductors used in open wiring pass through studs, plates joists, floors, walls or partitions. When the conductors are installed where they may be subject to mechanical damage, the conductors must be run along protective shields or running boards. Conventionally, open wires would be run along ceiling or floor joists in the attic, basement or crawl space and the wires could be attached on the sides of the studs in the walls.

Armored cable wiring is installed by running the cable through holes centrally drilled in the building structure members. The cable is, in turn, attached to boxes mounted on structural members, such as studs. Non-metallic sheathed cable can be installed and supported in a manner similar to armored cable. Rigid conduit, which requires field bends, can be concealed or erected on the surface.

Each of these conventional wiring methods is essentially independent of the building construction, but conventional construction techniques and conventional wiring techniques result in basic problems and inefficiencies since the structure and the wiring do not constitute parts of the same system. For example, the rough wiring including boxes, wires and conduits must be installed prior to installation of drywall. Drywall must also be cut to expose receptacle and switch boxes and plaster must be used to smooth any rough surfaces or mistakes. Also, the exact location of the boxes may no longer be possible after the installation of the drywall. Installation of the switches and outlets occurs after the drywall has been installed, thus requiring two trips by an electrician. Furthermore, such a system is not readily adaptable to changes in the wiring after installation of the drywall. These problems with the installation of electrical power wiring are compounded when other wiring systems, which are installed in frame structures, are considered.

There have been a number of suggestions for simplification of these conventional procedures. U.S. Pat. No. 3,529,389 disclosed a modular wall structure having raceways defined in modular prefabricated wall panels in which wires extend continuously in a bottom raceway. However, such raceways would be interrupted by obstructions such as doorways. Another approach has been simply to mount the wiring on the exterior of the wall. For example, U.S. Pat. No. 4,606,595 discloses a telephone distribution system in which the wiring is mounted on the surface of an interior wall. Commonly assigned U.S. Pat. application Ser. No. 867,412 filed May 15, 1986, a continuation of application Ser. No. 646,334 filed Aug. 31, 1984, now abandoned, discloses a premise wiring system including power, telephone, data and cable television conductors. Rails mounted on the exterior of the walls adjacent the baseboard provide not only conduits for the respective wires but also means for mounting receptacles and connectors. Other electrical wiring systems which can be mounted on the surface of a wall are disclosed in U.S. Pat. Nos. 3,464,052 and 4,479,687. U.S. Pat. No. 2,175,145 discloses an electrical distribution system in which the wiring is embedded within a molding which can be positioned at the junction between a wall and a floor. While each of these systems do add a certain degree of flexibility to an electrical distribution system, mounting the wires in an exterior molding or rail does possess certain aesthetic drawbacks.

The present invention not only provides the flexibility of these exterior distribution systems, but permits the wiring to be recessed behind the walls as with conventional wiring. Furthermore, a system according to this invention allows a substantial amount of rewiring, unlike conventional recessed systems.

SUMMARY OF THE INVENTION

An electrical distribution system integrated in a frame structure and a method for disposing electrical cables in the frame structure relies upon channels formed in the frame structure to house the cables. A single cable or a plurality of separate cables, such as power and telephone, can be positioned within the channels. In the preferred embodiment, the channels are formed by using members having an I-beam configuration for ceiling and floor beams and vertical columns. The ceiling or upper beam has an interior channel extending continuously around each room in the frame structure. The floor or lower beam also has an interior channel which also extends around each room of the frame structure, but which is interrupted by obstructions such as doorways. A plurality of vertical columns extend between the upper and lower beams and the interior channels in the columns communicate with the channels in both the upper and lower beams.

In the preferred embodiment, the interior walls are formed by panels, such as drywall panels, attached to the structure including the ceiling and floor beams and the columns. The channels are recessed behind these wall panels and the upper and lower channels remain unobstructed by the wall panels. The wall panels can be positioned to cover the vertical channels or the panel edges may be spaced apart so that the vertical channels remain unobstructed. In either case, cables can be positioned within the channels after the panels have been erected, since any covered vertical channel will be accessible through both the upper and lower communicating channels. Molding strips can be secured over the exposed channels after the wiring is installed. Switches and receptacles can also be installed after erection of the wall panels and at the same time that the wiring is installed. The channels extend completely around the frame structure between a ceiling plane and a floor plane. The upper channels extend continuously around the structure. When cables are disposed in the lower channels, obstructions such as doorways do not pose problems, because the cables can be routed through vertical channels on opposite sides of the obstruction and across the top through the upper channel.

In the preferred embodiment, stamped metal brackets provide rigidity to prevent twisting of the beams. These brackets can extend across the channels to retain the cables therein and the molding strips over the channels can be secured by the brackets. In one embodiment, flanges, on the brackets attaching the columns to the lower beam, support panels to simplify erection of the panels.

BRIEF DESCRIPTION OF THE DRAWINGS

FIG. 1 is a perspective view of a frame structure having wiring channels incorporated directly into the frame structure.

FIG. 2 is a perspective view of intersecting interior walls in a frame structure.

FIG. 3 is a view corresponding to FIG. 2 after installation of the drywalls, but prior to installation of the wiring.

FIG. 4 is a view corresponding to FIG. 3 showing the installation of wires after the drywalling.

FIG. 5 corresponds to FIG. 4 but shows the installation of baseboard molding and cove molding plus the installation of lighting fixtures in the cove molding.

FIG. 6 is a sectional view taken along section line 6-6 in FIG. 4 showing a receptacle mounted within a channel formed in the walls.

FIG. 7 is a partially exploded view showing the installation of a cable within an interior channel on an exterior wall and the provision of installation and a vapor barrier.

FIG. 8 is a view showing the installation of a cove molding at the intersection between a wall and the ceiling.

FIG. 9 is a view of a vertical column in a manner in which a cable is positioned within a vertical channel.

FIG. 10 shows the manner in which the wiring is deployed at the intersection of a vertical column and a ceiling beam..

FIG. 11 is a view similar to FIG. 10 but showing a vertical channel cut away to permit the cable to be laced from one side to the other.

FIG. 12 is an exploded view showing a plurality of brackets for attaching studs or columns to a floor beam and the interconnection of perpendicular floor beams.

DETAILED DESCRIPTION OF THE PREFERRED EMBODIMENT

The premise wiring or electrical distribution system comprising the preferred embodiment of this invention is suitable for use in a frame structure such as the building (B), containing rooms 1, 2 and 3 as shown in FIG. 1. This structure is intended to be respective, at least of a portion, of a residential or light commercial structure. The representative structure as shown in FIG. 1 is of a wood frame construction having exterior walls 4, 5, 6 and 7 and interior walls 8 and 9. Doorways 10, 11 and 12 and windows 13, 14, 15 and 16 are also shown. The wiring system depicted herein permits the wiring for a single level of a structure such as that shown in FIG. 1 with the wires being contained between the floor plane and the ceiling plane and allows the wires to be recessed in the wall. Multiple story structures can also use the same concept with each floor having access to an exterior source of electricity. The wires, conduits or cables, while recessed behind the walls, can be positioned before or after drywall or other interior paneling is erected.

FIG. 2 shows two intersecting interior walls in the structure of FIG. 1, prior to erection of drywall or interior paneling or installation of the wiring. Each wall has a ceiling beam 24 with an interior channel 40a formed therein extending along the entire length of the wall. A floor beam 26 also extends between the ends of the walls, but the floor beam 26 is interrupted by obstructions such as doorway 11. Floor beam 26 has a channel 40b located on the interior wall located substantially at the intersection between the wall and the floor where a baseboard might otherwise be located. Each wall has a plurality of conventional studs 28 extending between the ceiling beam 24 and the floor beam 26. In addition to the conventional studs 38, one or more columns 30 extend between the ceiling beam 24 and the floor beam 26 at selected locations along each wall. Each column 30 has an interior channel 40c which communicates either with the ceiling channel 40a or baseboard channel 40b, or both, in the manner which will be subsequently described.

In the preferred embodiment of this invention, the ceiling beam 24, the floor beam 26 and the columns 30 each have an I-beam cross section. The preferred embodiment of ceiling beam 24, floor beam 26 and columns 30 is in the form of an I-beam. These I-beams are formed by top and bottom parallel members joined by a central connecting web 44. Each I-beam forms an interior channel 40 bounded on three sides by the upper and lower sections 42 and 46 and by the side of the central web 44. In a wooden frame structure these I-beams may be constructed of conventional studs or similar members. Laminated composite beams can also be employed. Such laminated structural elements are currently used for truss joists, headers and beams and could easily be employed to form the ceiling beam 24, the floor beam 26 and the columns 30. Laminated structural components for use in residential and light commercial frame construction are currently manufactured by Truss Joist Corporation and by Wood Products Division, Gang-Nail Systems Inc.

FIG. 2 also shows wall boxes 41 located along the interior of an exterior wall. These wall boxes provide access to an external source of electricity or between floors of a multistory structure.

FIG. 3 corresponds to FIG. 2 and shows the erection of panels 32 to form the interior surface of the walls of the structure, the next step in the assembly of the structure. In the preferred embodiment of this invention, these panels 32 would comprise conventional drywall panels. Note that the panels 32 extend from the lower portion of the ceiling beam 24 to the upper portion of the floor beam 26. Note that the ceiling channel 40a remains unobstructed by the panels 32. The channel 40b in the floor beam similarly remains unobstructed. In the embodiment shown in FIG. 3, however, the vertical channels 40c extending between channels 40a and 40b are covered by the panels 32. FIG. 3 shows that the panels 32 can be erected prior to installation of the wires or conduits forming the electrical distribution system. Thus, the entire rough wiring step in residential construction is unnecessary. The drywall panels 32 can be completely erected and finished prior to installation of any electrical wiring.

FIG. 4 demonstrates the next step in the installation of the wiring system. Since the upper channel 40a has remained unobstructed by panels 32, and since the upper channel 40a is continuous within each room and around the entire structure, wires or cables may be positioned within the upper channel 40a and routed to any location between ceiling plane 20 and floor plane 22. The floor channel 40b is also unobstructed by panels 32 and extends around most of the structure. Note, however, that the floor channel 40b is obstructed by doorway 11 and is thus not completely continuous around each room. Vertical channels 40c do, however, communicate with the horizontal channels 40a and 40b, adjacent the ceiling and floor, respectively. Thus, access between ceiling channel 40a and floor channel 40b is possible at any location of a vertical channel 40c in a column member 30. Thus, if the wiring is to be principally distributed around the baseboard in channel 40b, the wiring can be routed around an obstruction such as a doorway by using vertical channels 40c on opposite sides of the doorway. As shown in FIG. 4, receptacles 70 and switches 72 can be aligned with vertical channels 40c or can be positioned within the baseboard channels 40b. The system described herein is also amenable to combination with conventional wiring techniques, which would permit an electrician to install a receptacle 70 or a switch 72 at any position along the wall. However, there are distinct advantages to positioning the receptacles and switches in alignment with a channel 40.

After the one-step installation of wiring and electrical accessory equipment, the channels 40a and 40b may be covered by positioning molding strips 34 and 38 over the channels, as shown in FIG. 5. The baseboard strip 34 can have openings for receptacles located within the baseboard channel, as shown in FIG. 6. The cover molding 38, at the intersection of the ceiling plane with the wall, can be combined with lighting fixtures 74, which can be located around the periphery of the rooms.

FIGS. 7-11 show the manner in which one or more cables can be positioned within the channels 40. In each of these embodiments, separate power and telephone cables are shown. For simplicity's sake, a conventional non-sheathed power cable 76, conventionally referred to as Romex cable, distributes power throughout the structure. A telephone cable 78 can be positioned within the same channel as the power cable 76. It should be understood that other cables such as burglar alarm system cables, doorbell cables, signal cables, coaxial cables or fiber optic cables can also be positioned within the channels 40. Special cables, including power, telephone, data and other conductors in a unitary cable, could also be employed.

The embodiment of FIG. 7 shows a baseboard channel located along an exterior wall. Note that the exterior channel can be filled with insulation 56 and a vapor barrier 58, which may consist of a plastic sheath, may be positioned around the floor joist 26.

Stamped metal brackets are especially suitable for use in this system. An inner bracket 48 is shown in FIG. 7 positioned within the baseboard channel. An outer bracket 50 can be positioned on the exterior of the cable after the cable has been inserted into channels 40b. Note that the bracket can be nailed to the floor beam 26. A centrally located hole 54 is adapted to receive a mounted retainer integrally molded on the baseboard molding strip 34. Thus, the molding strip 34 can be simply snapped to the baseboard joist and retained by the bracket 50.

FIG. 8 shows a typical upper channel located on the interior of an exterior wall. A cove molding strip 38 can be assembled to the ceiling channel by simply snapping cove molding strip 38 to a bracket 50.

Column 30 shown in FIG. 9 is suited for use with brackets 51 similar to the brackets 50 used in the ceiling joist and the floor joist. For the same size channels, bracket 51 would be identical to bracket 50. FIG. 9 shows a different aspect of this invention. Note that in FIG. 9 the panels 32 have been secured to the frame structure with the edges of panels 32 being spaced apart to expose the vertical channel 40c. A vertical molding 36 can be positioned between the spaced apart panels 32 to cover channel 40c and the cables disposed therein. It would be apparent to one skilled in the art that exposed vertical channels 40c would greatly simplify wiring and would facilitate the positioning of receptacles in the vertical channel at any position on the structure walls.

FIGS. 10 and 11 show the continuous character of the channels formed in the structure walls. The junction between a channel 40c in a vertical column 30 and a channel 40a in a ceiling beam 24 is shown in FIG. 10. Note that a portion of the bottom of the I-beam configuration of ceiling beam 24 aligned with channel 40c has been removed in FIG. 10. Thus channel 40c communicates with channel 40a.

FIG. 11 shows an additional feature which permits cables on one side of the central web of a ceiling beam 24 to communicate with a channel on the opposite side of the web 44. Note that a portion of the web 44 in the column 30 has been removed to provide this communication. It follows, therefore, that communication can be established throughout one level of a structure between a ceiling plane 20 and a floor plane 22 by employing the channeled ceiling joist 24, the channeled floor joist 26 and the channeled columns 30. Although the preferred embodiment of this invention employs members having an I-beam cross section, it should be understood that other channeled configurations could easily be substituted for the I-beam configuration depicted herein.

Not only is this system compatible with improvements in the installation of electrical wiring systems but, as can be seen in FIG. 12, brackets can be employed to attach studs 28 and columns 30 to the floor joist 26 and can be configured with drywall supports such as flanges 68. Note that each of the stamped and formed brackets 60, 62, 64 and 66 shown in FIG. 12 have a similar support 68. In assembling drywall, the bottom of drywall panels can be positioned in the support 68, thus greatly facilitating the erection of the drywall panels. FIG. 3 shows the position of drywall supports 68.

What is claimed:

1. A substantially enclosed wooden frame structure extending between a ceiling plane and a floor plane, the structure comprising:
    an upper beam extending continuously around the enclosed frame structure adjacent the ceiling plane, the upper beam having a first continuous interior channel formed therein;
    a lower beam extending around the enclosed frame structure adjacent the floor plane, the lower beam having a second interior channel formed therein;
    a plurality of vertical columns extending between the upper and lower beams, each vertical column having a third interior channel, each third interior channel communicating with at least one of the first and second channels;

an interior wall, the first, second and third channels being recessed behind the wall; and a plurality of stamped metal brackets spanning the channels;

electrical wiring disposed in the channels and extending around the enclosed frame structure, whereby the upper and lower beams and the vertical columns comprise parts of the load bearing structure and the electrical wiring can be disposed behind the interior wall after the interior wall has been erected on the previously assembled load bearing structure.

2. The frame structure of claim 1 wherein the interior wall comprises a plurality of discrete panels attachable to the interior of the frame structure.

3. The frame structure of claim 2 wherein the panels abut, enclosing the interior channels.

4. The frame structure of claim 2 wherein the edges of adjacent channels are spaced apart on opposite sides of the channels, the structure further comprising strips attachable to the respective upper beam, lower beam, and vertical channels to enclose the channels.

5. The frame structure of claim 1 wherein the upper beam, the lower beam, and the vertical columns each have an I-beam cross section.

6. The frame structure of claim 5 wherein the upper beam, the lower beam, and the vertical columns each are formed of a three piece composite wooden structure comprising first and second members and a central third member attached to the first and second members.

7. The frame structure of claim 6 wherein the first, second and third members comprise laminated members.

8. The frame structure of claim 1 further comprising a plurality of vertical studs between adjacent columns, vertical third channels being located only in columns.

9. The frame structure of claim 1 further comprising electrical outlet receptacles disposed along the interior wall in alignment with the channels.

10. The frame structure of claim 1 wherein the electrical wiring comprises electrical power cables and telecommunication cables.

11. The frame structure of claim 1 wherein the interior wall comprises a plurality of panels, the edges of adjacent panels being adjacent to the channels, and strips extending between the edges of adjacent panels, the strips being secured to the brackets.

12. The frame structure of claim 1 further comprising support brackets attached to the lower beams, the support brackets having support flanges, the lower edges of the panels being mounted in the support flanges.

13. The frame structure of claim 1 further comprising a vapor barrier in the channels on the interior of the upper and lower beams and the columns.

* * * * *